Patented June 22, 1937

2,084,630

UNITED STATES PATENT OFFICE 2,084,630

TREATMENT OF SILICATE ORES AND/OR THE LIKE

Camille Deguide, Aisemont-Lez-Fosses, Belgium, assignor to Société de Recherches et d'Applications Chimiques (Sorac), Societe Anonyme, Brussels, Belgium No Drawing. Application August 8, 1936, Serial No. 95,019. In Great Britain June 17, 1936

2 Claims. (Cl. 23—24)

This invention relates to the treatment of silicate ore or ores and the like, and more particularly to ores of rare earth metals such as ores of zirconium, thorium, glucinium, etc. without however being limited thereto.

The invention consists in calcining the silicate ore or ores in the presence of a barium compound or compounds, carbonate for instance, of an amount such that barium shall be present in a quantity at least sufficient for the formation with the silica present in the ore of dibarium silicate, whilst avoiding an excess of barium compound which would render the mixture fusible.

When the primary material contains not only silica, but also other oxides, such as oxides of zirconium, and/or of titanium, and/or of aluminium, and/or iron, and/or chromium, the amount of barium compound or compounds added should be at least sufficient to convert also these oxides respectively into barium metazirconate, titanate, aluminate, ferrate, chromate, etc. whilst avoiding an excess of barium compound which would render the mixture fusible.

The following description relates by way of example to ores of zirconium.

The presence of silica in the ores of zirconium, either in the form of silicate in the case of the zircon, or in the form of sand in the zirconium-bearing sands and rocks, is the cause why these ores cannot produce refractory materials having the good qualities which should be obtained from such a refractory material like the oxide of zirconium.

The harmful action of the silica is due to its volatility at high temperatures, to its facility of producing fusible silicates or certain nondesirable silicides.

The modes of treatment of ores of zirconium and more particularly of zircon $ZrSiO_4$ which are described hereinafter have for their object to avoid the above said drawbacks and to supply new industrial products, very useful in the industry as refractory or other products.

By way of example, a description will be given hereinafter of the treatment of a zircon having the following composition:

|  | Per cent |
|---|---|
| Ignition loss | 0.10 |
| Silica $SiO_2$ | 31.45 |
| Oxide of iron $Fe_2O_3$ | 0.35 |
| Alumina $Al_2O_3$ | 1.05 |
| Oxide of titanium $TiO_2$ | 0.80 |
| Oxide of zirconium $ZrO_2$ | 63.00 |
| Lime CaO | 1.20 |
| Magnesia MgO | 0.90 |
| Oxide of thorium | 0.00 |
| Oxide of cerium | 0.88 |
| Oxide of manganese | 0.00 |
| Phosphoric acid | 0.12 |

This ore, in the form of grains of sand or crushed more finely if desired, is intimately mixed with an amount of barium carbonate which is at least sufficient for converting the silica into dibarium silicate $SiO_2, 2BaO$, the oxide of zirconium into metazirconate of barium $BaZrO_3$, the titanium oxide into barium titanate, the alumina into aluminate and the iron into ferrate.

The use of barium carbonate for disintegrating ores is well known, but this unforeseen fact has now been observed during experiments that it is necessary to add an amount of barium salt sufficient to produce dibarium silicate and barium metazirconate for obtaining a mass refractory at the temperatures which are necessary for obtaining a good disintegration of the ore, that is to about 1400° C.

As the substance does not melt at 1400° C., it is possible to use for the operation of disintegration the industrial furnaces of large output, such as the rotary or tunnel furnace.

This could not be done if the amount of barium added to the ore were only sufficient for the formation of monobarium silicate $SiO_2.BaO$ and of barium metazirconate. Such a mass would melt at 1200° C., its passage inside a rotary or tunnel furnace would be impossible, the refractory lining of the furnace would be destroyed, and a large amount of barium salt would be lost by combining with the refractory lining of the furnace.

It is possible to increase somewhat the amount of barium salt which is necessary for the formation of dibarium silicate and barium metazirconate, but care should be taken to avoid an excess such that the mass would melt, with the grave drawbacks above referred to.

A mixture of 100 parts in weight of zircon for 320 parts of barium carbonate is advantageous in the present case.

Such a mixture is heated to about 1400° C., either in a tunnel furnace after being briquetted under pressure, or in a rotary furnace.

The heat drives away the carbonic acid from the barium carbonate, the silica forms dibarium silicate, and the zirconium forms barium zirconate; a mass is thus obtained which is not fused, but only sintered, which is highly refractory and may serve in certain cases as a basic refractory product. The mixture of 100 parts of zircon and 320 parts of barium carbonate weighs 345.5 parts after being calcined.

The sintered mass may also be treated as follows:

This mass consisting mainly of dibarium silicate and barium zirconate is crushed with hot water in a pug mill or in a ball crushing mill. The following reaction takes place:

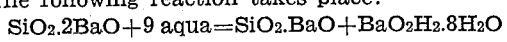
$SiO_2.2BaO + 9$ aqua $= SiO_2.BaO + BaO_2H_2.8H_2O$

The dibarium silicate is decomposed by the water into monobarium silicate which is insoluble and into hydroxide of barium which is soluble. The metazirconate remains insoluble with the titanate and with the ferrate, the alumina forms barium aluminate which is soluble. The solution of barium hydroxide obtained after decantation or filtration may be collected for separation of the hydrate $BaO_2H_2.8H_2O$ by crystallization. The calcined mass amounting to 345.5 parts obtained from 100 parts of the ore, yields 153.5 parts of crystallized hydrate $BaO_2H_2.8H_2O$.

The residue freed by washing from the soluble barium hydroxide consists mainly of monobarium silicate, barium zirconate, barium ferrate, barium titanate and water. The silica may be extracted by one of the two following methods:

A—The wet residue is crushed well under water to free it from the barium hydroxide produced by the decomposition of the dibarium silicate and barium oxide (if the barium carbonate has been used in a slight excess), is boiled with water and with an amount of sodium carbonate sufficient for producing the following reaction:

$$SiO_2.BaO+Na_2CO_3+aqua=$$
$$Na_2SiO_3+BaCO_3+aqua$$

The monobarium silicate is therefore decomposed into soluble sodium silicate and insoluble barium carbonate. The mass is filtered, washed to eliminate the solution of alkaline silicate which is collected, and evaporated to about 30° Bé. This solution may thus be used with advantage in the soap making industry.

The residue consists mainly of barium zirconate and of barium carbonate.

B—Instead of treating the residue freed from the barium hydroxide by washing with carbonate of sodium, it may be carbonated by means of carbonic acid according to the following reaction:

$$SiO_2.BaO+H_2O+CO_2=BaCO_3+H_2SiO_3.$$

The monobarium silicate is decomposed in the presence of water by the carbonic acid into barium carbonate and silica in jelly form. Caustic soda is caused to act upon this mixture for dissolving the silica in the form of sodium silicate and leaving the barium carbonate as a residue together with the barium zirconate as shown by the following formula:

$$BaCO_3+H_2SiO_3+2NaOH=$$
$$BaCO_3+Na_2SiO_3+2H_2O$$

In the examples A and B, potassium carbonate and caustic potash may be substituted for the sodium carbonate and caustic soda; potassium silicate will then be obtained instead of sodium silicate.

The removal of silica from the ore chosen as an example, requires 60 parts of sodium carbonate for 100 parts of ore and there is formation of 69 parts of dry alkaline silicate, or 230 parts of sodium silicate at 30%.

The residue freed from silica by one or the other of the above methods consists mainly of barium carbonate and barium zirconate and is treated by one of the following methods:

I—The residue after being dried is calcined at 1400° C. or 1500° C. inside a furnace of any type, preferably a rotary or tunnel furnace, for driving away the carbonic acid of the barium carbonate and for converting the metazirconate of barium into orthozirconate of barium as follows:

$$BaZrO_3+BaCO_3=Ba_2ZrO_4+CO_2.$$

The product does not melt at very high temperatures and may be used as a refractory material.

If the ore used were richer in silica than that chosen as an example, or if an amount of barium carbonate higher than that mentioned above had been used, the barium orthozirconate would be accompanied by oxide of barium and it should be washed with water to eliminate this as barium hydroxide.

It is also possible to mix the barium orthozirconate with oxide of zirconium and to heat at a very high temperature for obtaining metazirconate of barium which is also a refractory substance:

$$Ba_2ZrO_4+ZrO_2=2BaZrO_3.$$

The barium orthozirconate obtained from 100 kilos of ore weighs about 240 kilos; it contains barium titanate and ferrate and also a small amount of lime and magnesia, if these bases are present in the ore.

II—The residue freed from silica as said above may be dissolved by hydrochloric acid as follows:

$$BaZrO_3+BaCO_3+8HCl=$$
$$ZrCl_4+2BaCl_2+4H_2O+CO_2$$

There is formation of chloride of zirconium and barium chloride which are soluble. Any iron and titanium pass also into solution.

If a portion of the uncrushed ore has escaped the disintegration, it remains in the residue and is filtered off.

The solution containing the chloride of zirconium and the chloride of barium is treated by one of the following methods:

(a) To the solution containing the chlorides of zirconium and barium, decarbonated ammonia is added to precipitate the hydrate of zirconium:

$$ZrCl_4+BaCl_2+4H_2O+4NH_3=$$
$$H_4ZrO_4+BaCl_2+4NH_4Cl.$$

The hydrate of zirconium is filtered off, washed and calcined for converting it into oxide $ZrO_2$ which is a first class refractory product owing to its small heat and electric conductivity and its small coefficient of heat expansion.

According to the nature of the ores, this oxide may contain a little titanium and iron.

To the solution containing the barium chloride, ammonia is added if necessary, and carbonic acid is sent into the mass to precipitate the barium carbonate which is filtered and washed and may serve for a subsequent operation.

The ammoniacal solution freed from the barium is treated with lime in a known manner to recover ammonia according to the following reaction:

$$2NH_4Cl+CaO_2H_2=CaCl_2+2NH_3+2H_2O$$

(b) To the solution containing the chlorides of zirconium and barium and the excess of hydrochloric acid is added either sulphuric acid, or gypsum or another soluble sulphate. There is a precipitation of barium sulfate or "white paint" which is filtered and may be used as a paint.

$$BaCl_2+CaSO_4+H_2O=BaSO_4+CaCl_2+H_2O$$
$$BaCl_2+MgSO_4+H_2O=BaSO_4+MgCl_2+H_2O$$
$$BaCl_2+H_2SO_4+H_2O=BaSO_4+H_2O+2HCl$$

The filtered solution freed from barium sulphate and containing chloride of zirconium is treated with lime for precipitating hydrate of zirconium which is filtered off, washed and calcined, supplying thus oxide of zirconium $ZrO_2$, the refractory material above referred to:

$$ZrCl_4+2CaO_2H_2=H_4ZrO_4+2CaCl_2.$$

I claim:

1. A process of treating a silicate ore containing silica and oxide of zirconium, which comprises the steps of calcining the ore in the presence of a barium compound so as to produce dibarium silicate and barium metazirconate whilst avoiding a fusing of the mass, treating the product obtained to form sodium silicate in solution, with barium metazirconate and barium carbonate as a residue, calcining the latter to convert the barium metazirconate into barium orthozirconate.

2. A process of treating a silicate ore containing silica and oxide of zirconium, which comprises the steps of calcining the ore in the presence of a barium compound so as to form dibarium silicate and barium metazirconate whilst avoiding a fusing of the mass, treating the product obtained to obtain sodium silicate in solution and barium metazirconate and barium carbonate as a residue, calcining the latter to obtain barium orthozirconate as a residue, mixing the latter with oxide of zirconium, and heating the mixture at a high temperature so as to obtain metazirconate of barium.

CAMILLE DEGUIDE.